(12) United States Patent
Song et al.

(10) Patent No.: US 8,718,990 B2
(45) Date of Patent: May 6, 2014

(54) TIRE SECOND ORDER HARMONICS WITH RIB SHIFT METHODOLOGY

(75) Inventors: Tao Song, Hudson, OH (US); Karl E. Sundkvist, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 578 days.

(21) Appl. No.: 12/977,590

(22) Filed: Dec. 23, 2010

(65) Prior Publication Data

US 2012/0166167 A1    Jun. 28, 2012

(51) Int. Cl.
*G06G 7/48* (2006.01)

(52) U.S. Cl.
USPC .......................................................... 703/7

(58) Field of Classification Search
USPC .......................................................... 703/7
See application file for complete search history.

(56) References Cited

U.S. PATENT DOCUMENTS

| | | | |
|---|---|---|---|
| 3,989,780 A * | 11/1976 | Vorih | 264/40.1 |
| 4,474,223 A | 10/1984 | Landers | |
| 4,788,651 A * | 11/1988 | Parker et al. | 703/6 |
| 5,759,312 A | 6/1998 | Wesolowski | |
| 5,996,660 A | 12/1999 | Kakumu et al. | |
| 6,347,547 B1 | 2/2002 | Moriguchi et al. | |
| 6,651,716 B1 | 11/2003 | Brown et al. | |
| 6,800,161 B2 | 10/2004 | Takigawa et al. | |
| 7,082,816 B2 | 8/2006 | Zhu | |
| 7,195,047 B2 | 3/2007 | Sieverding et al. | |
| 7,213,451 B2 | 5/2007 | Zhu et al. | |
| 7,533,010 B2 | 5/2009 | Sundkvist et al. | |
| 2002/0177959 A1 * | 11/2002 | Williams et al. | 702/41 |

OTHER PUBLICATIONS

Wikipedia, "Tire Uniformity," at http://en.wikipedia.org/w/index.php?title=uniformity&printable=yes (last visited Aug. 26, 2010).

* cited by examiner

*Primary Examiner* — Hugh Jones
(74) *Attorney, Agent, or Firm* — Wood, Herron & Evans, LLP

(57) ABSTRACT

A method of improving the high-speed uniformity of tire performance that reduces low and/or high harmonics. The method includes determining a force variation that is created by rotation of a first tire, having a first tread design, at high speed. A second order harmonic of the force variation is analyzed. A second tire design is generated that circumferentially shifts one or more ribs of the first tread design to minimize the second order harmonic alone or in combination with other order harmonics.

11 Claims, 12 Drawing Sheets

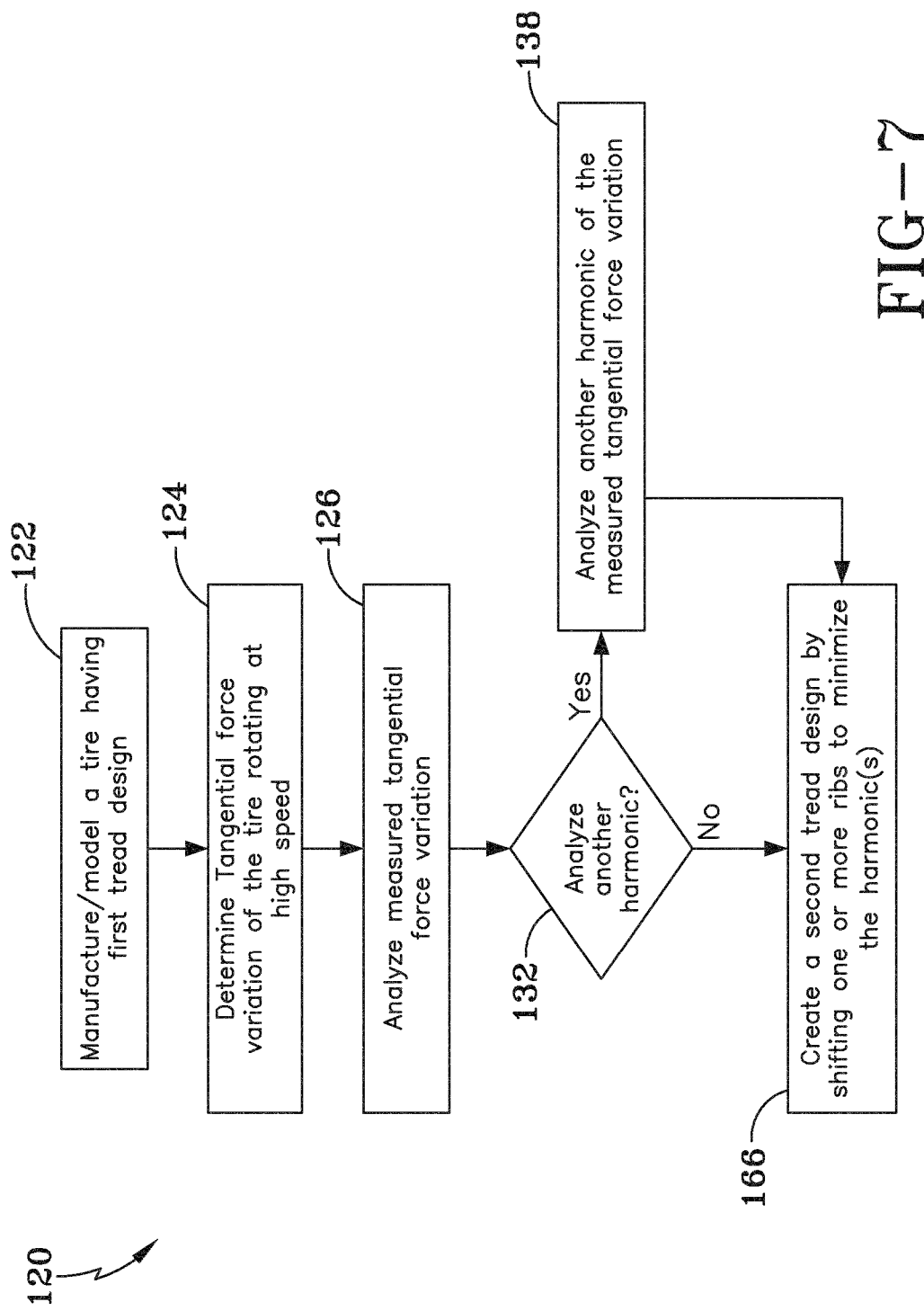

TIRE SECOND ORDER HARMONICS WITH RIB SHIFT METHODOLOGY

TECHNICAL FIELD

The present invention relates generally to improvements in tire tread design to improve high speed uniformity.

BACKGROUND OF THE INVENTION

Vibrations associated with a moving vehicle are due, at least in part, to tire/road contact forces. These vibrations may originate from a non-uniformity of the tire construction that is amplified by rotation of the tire, creating a rhythmic beating while driving. These may be further amplified by the resonances of the tire/vehicle system.

Generally, the amplitude of the vibrations increases with an increased speed of the vehicle. Therefore, it has become of significant interest, within the tire manufacturing industry, to improve the design of tires for better performance at high speeds. High speed uniformity ("HSU") machines are commercially available for quantifying the various forces generated when the tire that is rotating with an angular velocity that is equivalent to land speeds of up to 250 km/h (about 155 mph). Alternatively, computer models have been designed to simulate the force variations without actual construction of the tires.

There is significant interest in continuing to develop further improvements in the HSU performance of tires by evaluating the effects of tire construction, including the shape and stiffness of the tire tread.

SUMMARY OF THE INVENTION

The present invention overcomes the foregoing and other shortcomings and drawbacks of a high speed uniformity performance of tire designs by reducing low and/or high harmonics to achieve improved high speed uniformity performance. While the invention will be described in connection with certain embodiments, it will be understood that the invention is not limited to these embodiments. On the contrary, the invention includes all alternatives, modifications, and equivalents as may be included within the spirit and scope of the present invention.

In one illustrative embodiment, the invention is directed to a method of improving the high-speed uniformity of tire performance. The method includes determining a force variation that is created by rotation of a first tire at high speed. The first tire has a first tread design. A second order harmonic of the force variation is analyzed. A second tire design is generated that circumferentially shifts one or more ribs of the first tread design to minimize the second order harmonic.

The first tire having the first tread design may be modeled and the rotation simulated on a computer. Alternatively, the tire may be constructed and rotated on a high speed uniformity machine.

The method may further include analyzing an $n^{th}$ order harmonic of the force variation. The ribs are further shifted in accordance with minimizing the $n^{th}$ order harmonic.

In another illustrative embodiment, the invention is directed to a tire tread design having first and second shoulder ribs and at least one intermediate rib between the first and second ribs. Each rib includes a pitch sequence of block elements. The pitch sequence of the block elements of the second shoulder rib and/or the at least one intermediate rib is shifted relative to the first shoulder rib to minimize a second order harmonic of a force variation when the tire is rotated at high speed.

The above and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention and, together with a general description of the invention given above, and the detailed description of the embodiments given below, serve to explain the principles of the invention.

FIG. 7 is a flow chart illustrating one exemplary method of improving the high speed uniformity of a tire tread design.

DEFINITIONS

Figure 1:
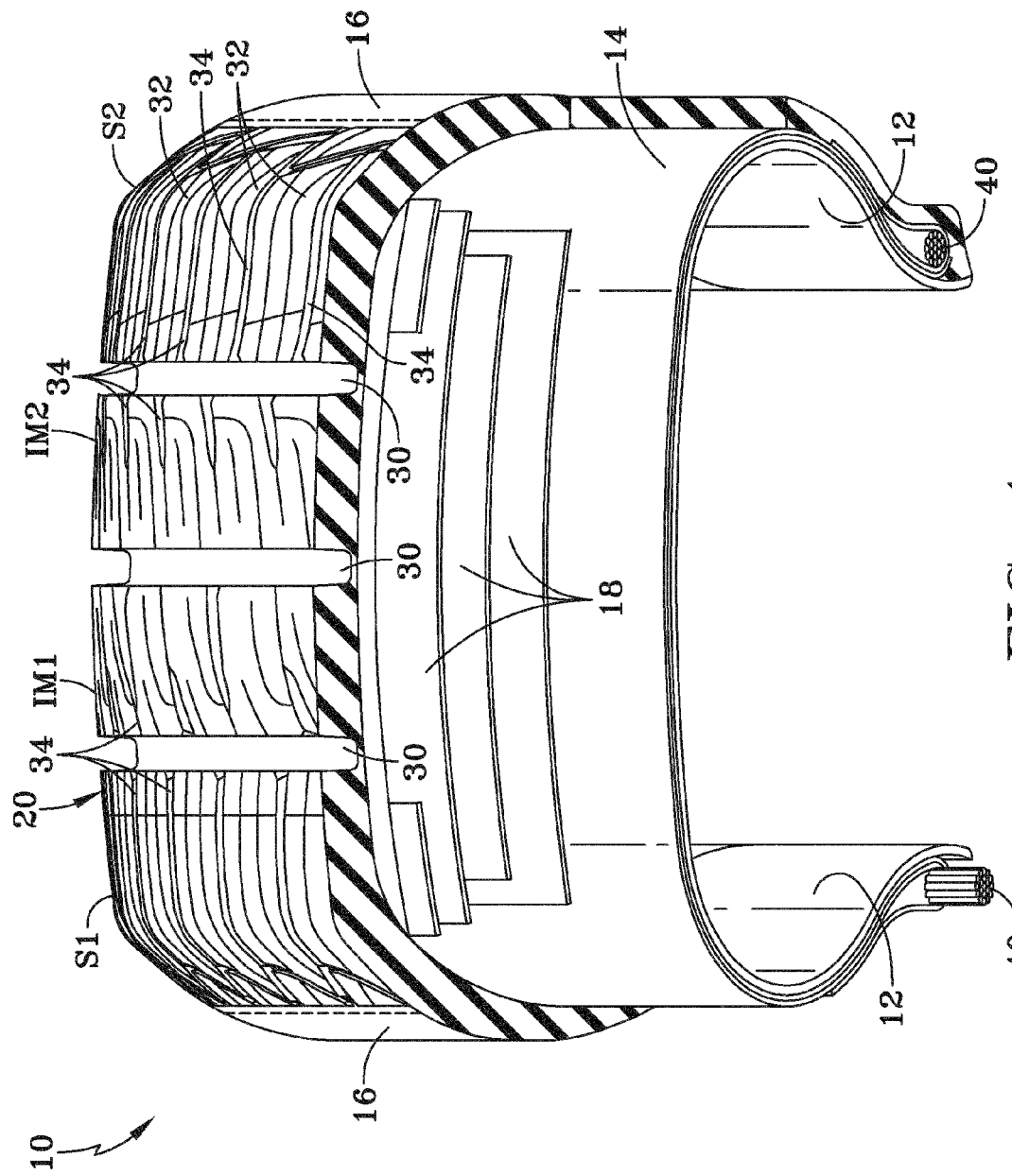
FIG. 1 is an elevated perspective view, in partial cross-section, of a tire having a first tread design.

The following terms may be used throughout the descriptions presented herein and should generally be given the following meaning unless contradicted or elaborated upon by other descriptions set forth below.

"Air Chamber" means an annular pneumatic chamber defined between a tire and a rim when the tire is installed on the rim.

"Axial" refers to a direction that is parallel to the tire axis.

"Bead" means a circumferentially substantially inextensible metal wire assembly that forms the core of the bead area and is associated with holding the tire to the rim.

"Belt" or "Reinforcing Belt" means at least two annular layers or plies of parallel cords, woven or unwoven, underlying the tread, unanchored to the bead, and having both left and right cord angles in the range from 17° to 27° with respect to the equatorial plane of the tire.

"Block Element" means the tire tread elements that are defined by a circumferential groove or shoulder and a pair of lateral extending grooves or possibly sipes.

"Block Width" means the arc length of the block element surface in the meridional direction.

"Block length" means the arc length of the block element surface along the circumference of the tire tread.

"Circumferential" means lines or directions extending along the perimeter of the surface of the tire tread perpendicular to the axial direction.

"Footprint" means the contact patch or area of contact of the tire tread with a flat surface at zero speed and under normal load and pressure.

"Inner Liner" means a molded rubber layer covering the inner side of the carcass and facing the air chamber when the tire is assembled.

"Groove" means an elongated void area in the tire tread that may extend circumferentially or laterally about the tire tread in a straight, curved, or zigzag manner. Circumferentially and laterally extending grooves sometimes have common portions. Grooves may be of varying depths in the tire. The depth of the groove may vary around the circumference of the tire tread, or the depth of one groove may be constant, but vary from the depth of another groove in the tire. Grooves are generally open in the tire's footprint.

"Lateral" refers to a direction that is going from one sidewall of the tire towards the other sidewall of the tire, generally across the tire tread and perpendicular to the tire circumference.

"Lateral Force Variation" means a dynamic non-uniformity referring to the tire's lateral (axial) force being non-uniform around the tire's circumference, thereby causing lateral vibration (e.g., wobbling) during driving. It is typically generated by a non-uniform dimensional, stiffness, or mass distribution both along the meridional contour and along the tire's circumference.

"Meridian" and "Meridional" refer to a tire cross-section cut along a plane that includes the tire axis.

"Overlay" means a fabric material laid along an outer surface of the belts to stabilize the belts during operation.

"Ply" or "Plies" means a calendared fabric thread coated with rubber and wound between the beads to form the conventional carcass of a tire.

"Pneumatic Tire" means a laminated mechanical device of generally toroidal shape, usually an open torus, having beads and a tread and made of rubber, chemicals, fabric, and steel or other materials. When mounted on the wheel of a motor vehicle, the tire through its tread provides traction and contains the fluid that sustains the vehicle load.

"Radial" refers to a direction that extends radially toward or away from the axis of rotation of the tire.

"Radial Force Variation" means a dynamic non-uniformity referring to the tire's radial force being non-uniform around the tire's circumference, thereby causing vertical and fore-aft vibration during driving. It is typically generated by a non-uniform dimensional, stiffness, or mass distribution along the tire's circumference.

"Rib" means a circumferentially extending strip of rubber on the tire tread, which is defined by at least one circumferential groove and either a second such groove or a lateral edge, the strip being laterally undivided by full-depth grooves.

"Sidewall" means that portion of the tire between the tire tread and the bead area.

"Shoulder" means the upper portion of the sidewall just below the tire tread edge.

"Sipes" means small slots molded into the tread elements of the tire that subdivide the tire tread blocks and improve traction. Sipes are generally narrow in width and closed in the tire's footprint as opposed to grooves that remain open in the tire's footprint.

"Sipe Length" means the arc length of the sipe between successive block elements of the tire tread of the same rib.

"Tangential" refers to segments of circular curves that intersect at a point through which can be drawn a single line that is mutually tangential to both circular segments.

"Tangential Force Variation" means a non-uniform rotation of the tire's outer surface relative to the rotation of the tire's bead area. It produces a fore-aft or "push-pull" force variation which is generated at the surface of contact between the tire and the road surface in a direction both tangential to the tire tread and perpendicular to the tire axis of rotation.

"Tire axis" means the tire's axis of rotation.

"Tread" means a molded rubber component, which includes the portion of the tire that comes into contact with the road when the tire is normally inflated and under normal load.

DETAILED DESCRIPTION

Figure 2:
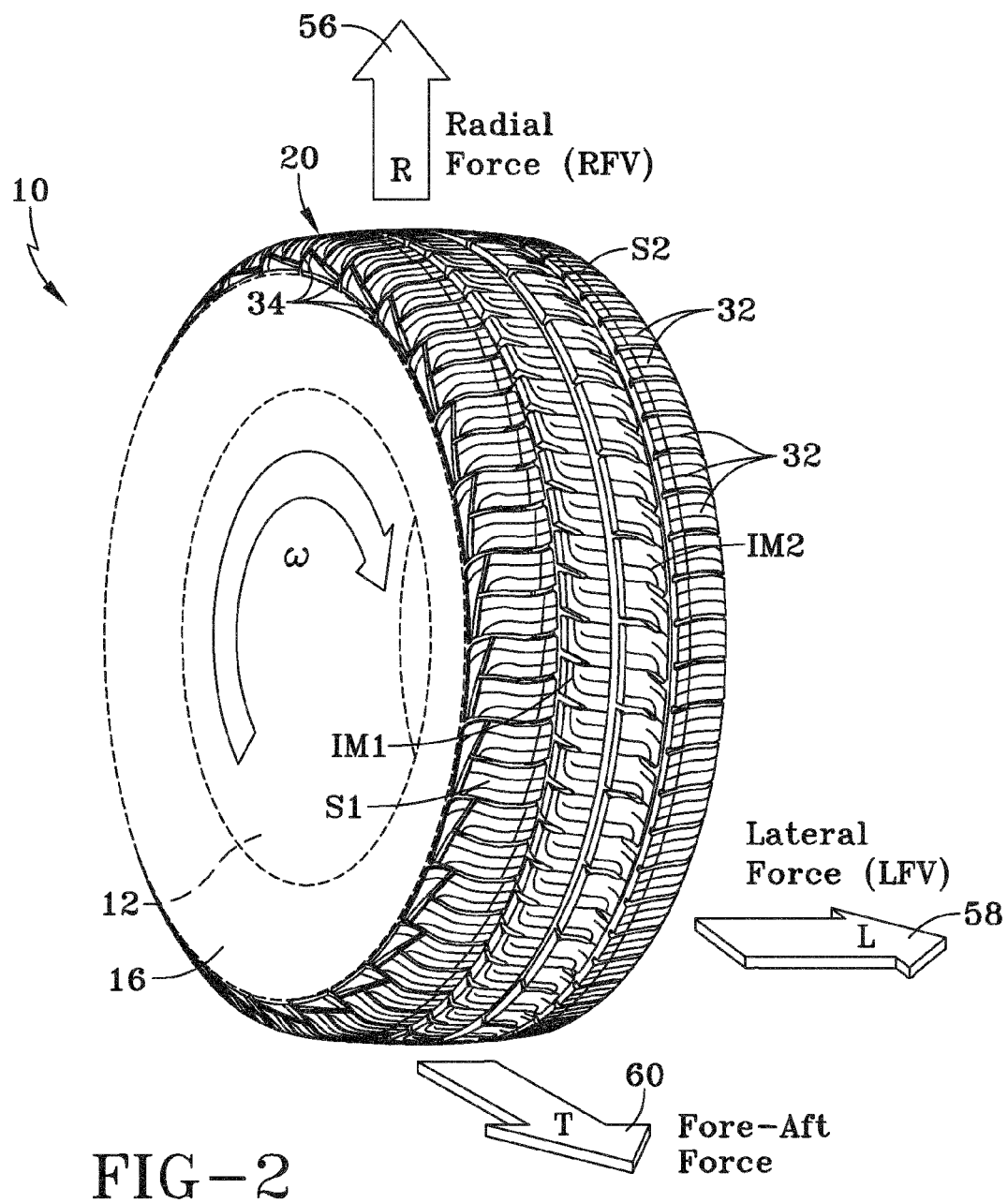
FIG. 2 is an elevated perspective view of the tire of FIG. 1.
Figure 3:
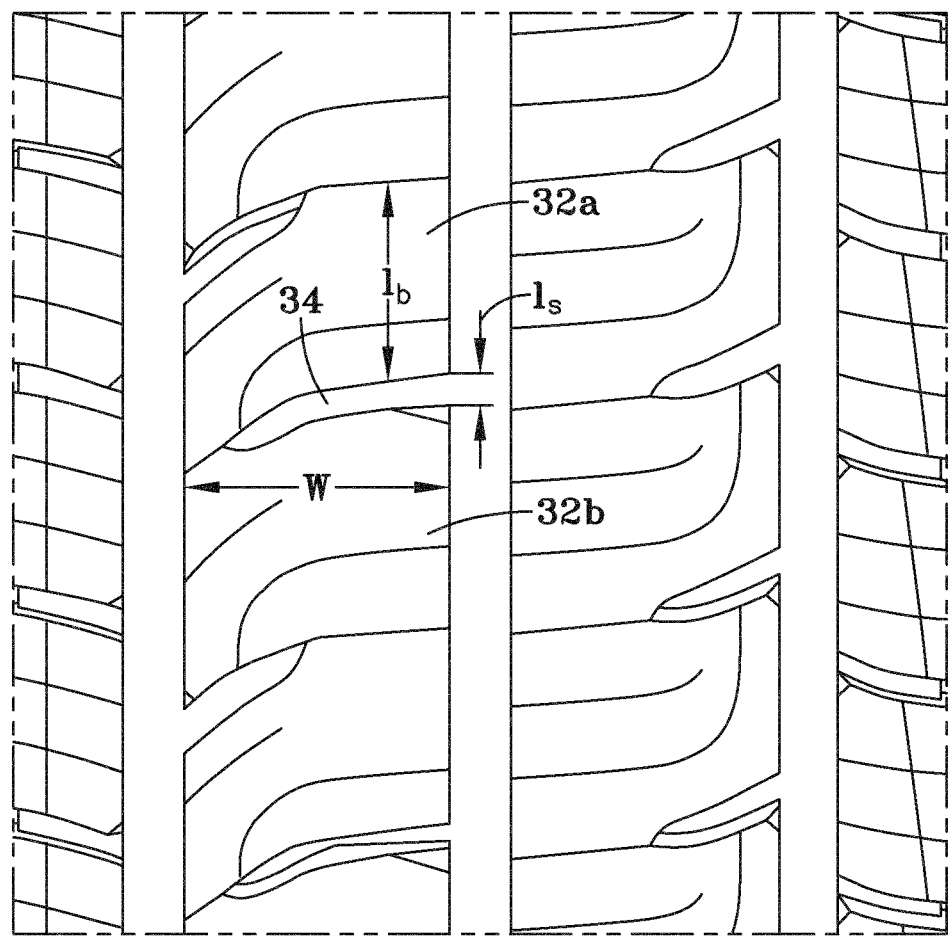
FIG. 3 is a diagrammatic view of two block elements and a sipe of a tread design for the tire of FIG. 1.

Referring now to the figures, and in particular to FIGS. 1-3, a pneumatic tire 10 ("tire") is shown in partial cross-section. The tire 10 is a composite structure having an inner liner 12 for air containment within an air chamber (not shown), one or more plies 14 for providing a particular shape, sidewalls 16 for protecting the inner liner 12 and the one or more plies 14 from environmental elements, one or more belts 18 for increasing the tire stiffness, and a tire tread 20 ('tread"). The tread 20 includes a particular design according to a desired function, such as wet and dry road traction, the likelihood of hydroplaning, noise level, vehicle handling during cornering, and steering response.

The tread 20, as shown in FIGS. 1 and 2, includes four ribs: a first shoulder rib S1, a second shoulder rib S2, and first and second intermediate ribs Im1, Im2. While not specifically shown, one or more medial ribs may also be included. The ribs S1, Im1, Im2, S2 form the circumferential point of contact between the tread 20 and the road (not shown). The shoulder ribs S1, S2 extend bilaterally around the tire 10 to ensure contact between the tread 20 and the road (not shown) during vehicle maneuvering. Each of the ribs S1, Im1, Im2, S2 is generally separated from the adjacent rib(s) by a circumferential groove 30.

Each of the ribs S1, Im1, Im2, S2 is comprised of a plurality of block elements 32 ("blocks"), or segments, wherein each block 32 is at least partially isolated from an adjacent block 32 by a lateral groove 34. A particular tread pattern may include any combination of isolated and connected blocks 32. FIG. 3 better illustrates, in a diagrammatic view not necessarily to scale, some additional detail of two successive blocks 32a, 32b and the associated lateral groove 34. Each block 32a, 32b has a length, $l_b$, along the circumferential direction of the tread 20 and a width, w, that is orthogonal to $l_b$ and in the radial direction. While the blocks 32a, 32b are illustrated herein as having similar $l_b$, this is not necessary or required. Further, the blocks 32a, 32b are separated by the lateral groove 34 having a length, $l_s$. One of ordinary skill in the art would readily appreciate that various combinations of blocks 32 and/or lateral grooves 34 are possible and indeed may be advantageous to effectuate a certain tire performance. A particular sequence, or unit, of blocks is repeated for the length, or extent, of the rib S1, Im1, Im2, S2 and is referred to as a pitch.

Together, the lateral grooves 34 and circumferential grooves 30 allow for some movement and compliance of the blocks 32 and thus improve traction between the tire 10 and the road. The number and style of sipes 34, as well as the relative sizes and shapes of the blocks 32 within the same rib or as compared between ribs, may be varied to adjust the relative stiffness of the ribs S1, Im1, Im2, S2 and affect traction.

Figure 4:
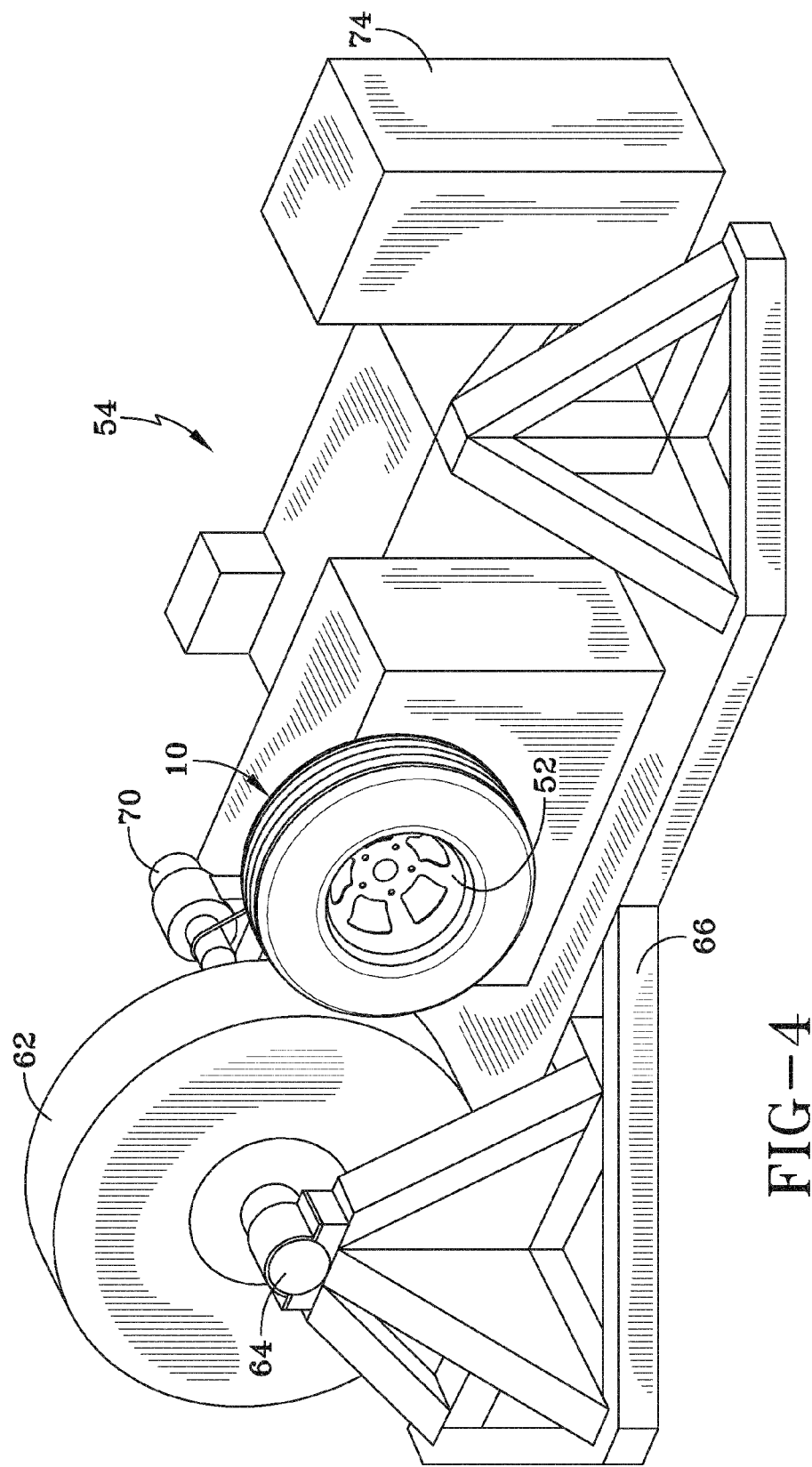
FIG. 4 is a side-elevational view of a high speed uniformity ("HSU") machine shown with the tire of FIGS. 1-3 mounted in the machine.

Referring now to FIGS. 1-2 and 4, when the tire 10 is mounted onto a rim, a bead assembly 40 operates to anchor the tire 10 to the rim. For example, during quality control and product testing, the tire 10 may be mounted onto the rim 52 of a high speed uniformity ("HSU") machine. One example of the HSU machine 54, shown in FIG. 4, rotates the tire 10 at high speeds and measures force variations on the tire 10 in one or more of three directions: radial 56, lateral 58, and tangential 60. High speeds include all linear velocities of at least 10 mph (16 kph).

One suitable HSU machine includes a Model 1064B High Speed Uniformity Machine from TMSI of Akron, Ohio. The HSU machine 54 includes a roadwheel 62, which contacts the mounted tire 10 to simulate the road surface. The roadwheel 62 is coupled to a rotary-style motor (not shown) by an axle 64, which may include multiple axles or structural components. The wheel 10 with the rim 52 and the roadwheel 62 are coupled to a carriage platform 66. The carriage platform 66 may further include a tire load actuator 70 for selecting the amount of interaction between the tire 10 and the roadwheel 62 to simulate the load of the particular vehicle onto the tire 10.

As the tire rotates with a particular angular velocity, to, one or more force cells 71 (FIG. 5) measure the force variations in each of the three directions 56, 58, 60. The force cells 71 (FIG. 5) may include analog devices, such as a contact stylus or touch-probe, that physically contact the tire and are deflected during tire rotation; or digital devices such as capacitive sensors that generate an electric field that is altered during tire rotation or laser sensors where changes in reflected light are measured during tire rotation. The analog or digital signal generated by the force cells 71 (FIG. 5) is transmitted in a known manner, e.g., via a wired or wireless communications, to a controller 74. The controller 74 may be configured to store the signal, transmit the signal, or manipulate the signal in a manner that is described in greater detail below.

Figure 5:
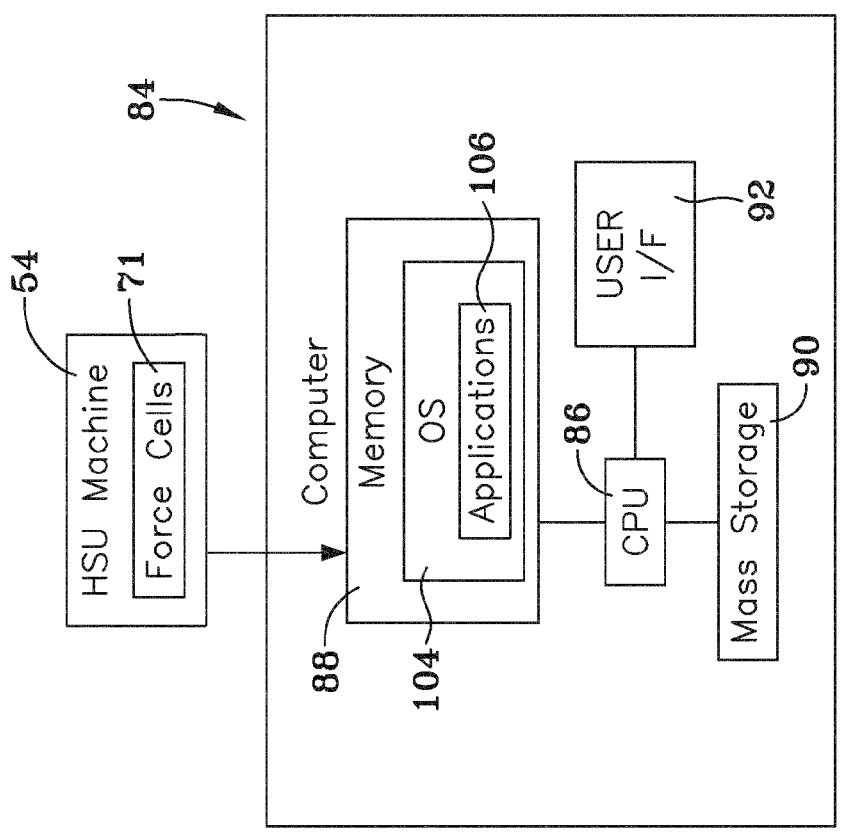
FIG. 5 is a schematic illustration of a computer configured for performing harmonic analysis in accordance with embodiments of the invention.

The controller 74 may be a computer 84, such as the computer that is shown in FIG. 5 that may be considered to represent any type of computer, computer system, computing system, server, disk array, or programmable device such as multi-user computers, single-user computers, handheld devices, networked devices, etc. The computer 84 may be implemented using one or more networked computers, e.g., in a cluster or other distributed computing system. The computer 84 will be referred to as "computer" for brevity sake, although it should be appreciated that the term "computing system" may also include other suitable programmable electronic devices consistent with embodiments of the invention.

The computer 84 typically includes at least one processing unit 86 (illustrated as "CPU") coupled to a memory 88 along with several different types of peripheral devices, e.g., a mass storage device 90, a user interface 92 (including, for example, user input devices and a display), and a network interface 94. The memory 88 may include dynamic random access memory (DRAM), static random access memory (SRAM), non-volatile random access memory (NVRAM), persistent memory, flash memory, at least one hard disk drive, and/or another digital storage medium. The mass storage device 90 is typically at least one hard disk drive and may be located externally to the computer 84, such as in a separate enclosure or in one or more networked computers, one or more networked storage devices (including, for example, a tape drive), and/or one or more other networked devices (including, for example, a server).

As illustrated in FIG. 5, the computer 84 includes the one processing unit 86, which, in various embodiments, may be a single-thread, multi-threaded, multi-core, and/or multi-element processing unit (not shown) as is well known in the art. In alternative embodiments, the computer 84 may include a plurality of processing units that may include single-thread processing units, multi-threaded processing units, multi-core processing units, multi-element processing units, and/or combinations thereof as is well known in the art. Similarly, the memory 88 may include one or more levels of data, instruction, and/or combination caches, with caches serving the individual processing unit 86 or multiple processing units (not shown) as is well known in the art.

The memory 88 of the computer 84 may include an operating system 104 (illustrated as "OS") to control the primary operation of the computer 84 in a manner that is well known in the art. The memory 88 may also include at least one application 106, or other software program, configured to execute in combination with the operating system 104 and perform a task, such as harmonic analysis and/or tread design as described herein.

In general, the routines executed to implement the embodiments of the invention, whether implemented as part of an operating system 104 or a specific application 106, component, algorithm, program, object, module or sequence of instructions, or even a subset thereof, will be referred to herein as "computer program code" or simply "program code." Program code typically comprises one or more instructions that are resident at various times in the memory 88 and/or mass storage devices 90 in the computer 84, and that, when read and executed by the processing unit 86 in the computer 84, causes the computer 84 to perform the steps necessary to execute steps or elements embodying the various aspects of the invention.

Those skilled in the art will recognize that the environment illustrated in FIG. 5 is not intended to limit the present invention. Indeed, those skilled in the art will recognize that other alternative hardware and/or software environments may be used without departing from the scope of the invention.

Figure 6:
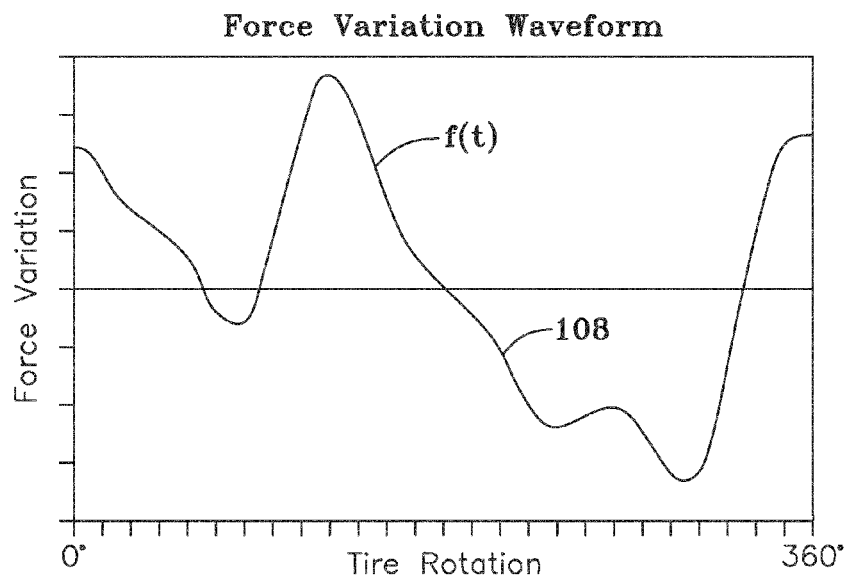
FIG. 6 is a graph showing a periodic waveform.
Figure 6A:
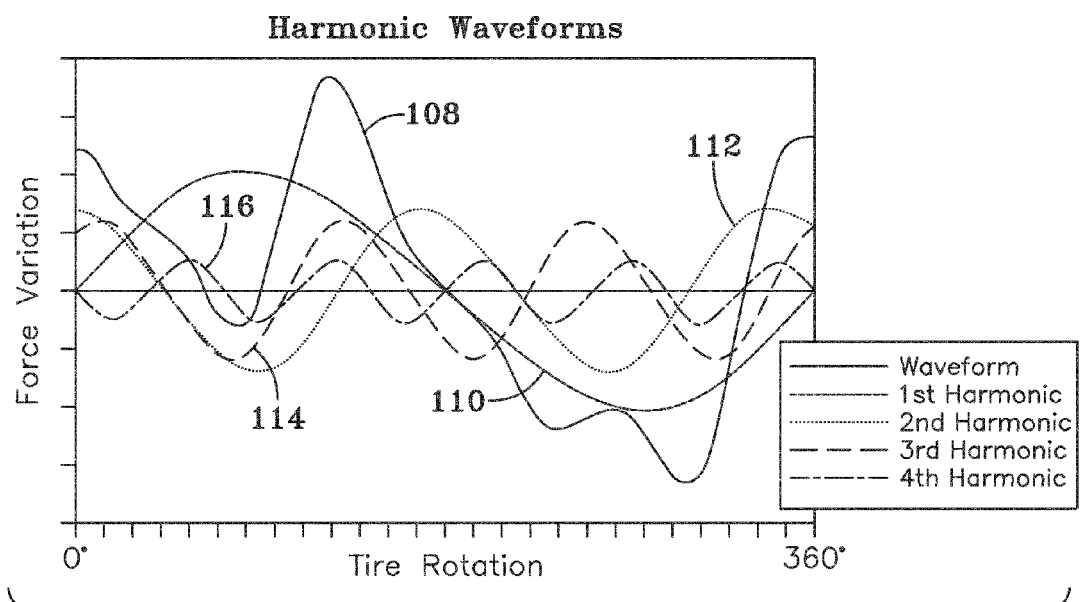
FIG. 6A is a graph showing the waveform and four orders of harmonics of the waveform of FIG. 6.

Referring still to FIG. 5, and with additional reference to FIGS. 6 and 6A, an exemplary harmonic analysis, which may be utilized in determining tire uniformity, is described. According to the harmonic analysis, a force variation in at least one of the three directions 56, 58, 60 (FIG. 2) is detected and correlated with time. The force variation changes with time, or degree of tire rotation, and may be displayed on an oscilloscope or reconstructed on the computer 84 (FIG. 5) as a waveform, f(t) 108. Because the same location of the tread 20 (FIG. 1), or the same degree of rotation, will be sampled after each complete turn of the tire 10 (FIG. 1), i.e., every 360° of tire rotation, the same force variation amplitude should be measured at certain time intervals and f(t) 108 is said to be periodic. The periodic nature of f(t) 108 may be described as a Fourier series for a $2\pi$-periodic function, i.e., a function that is integrable on $[-\pi, \pi]$, and wherein $2\pi$ radians is equivalent to 360°:

$$f(t) = a_0 + \sum_{n=1}^{\infty} [a_n \cos(nt) + b_n \sin(nt)] \qquad \text{Equation 1}$$

where t is time and $a_n$ and $b_n$ are the Fourier coefficients of f(t) and are defined as:

$$a_n = \frac{1}{\pi}\int_{-\pi}^{\pi} f(t)\cos(nt)dx, n \geq 0 \qquad \text{Equation 2}$$

$$b_n = \frac{1}{\pi}\int_{-\pi}^{\pi} f(t)\sin(nt)dx, n \geq 1 \qquad \text{Equation 3}$$

Referring again to Equation 1, the waveform f(t) may be decomposed into a series of n sine/cosine-containing terms, where n ranges from 1 to ∞, and each term is given by:

$$a_n \cos(nt) + b_n \sin(nt) \qquad \text{Equation 4}$$

The n=1 term includes the longest spatial period, i.e., the lowest spatial frequency, and is often referred to as the fundamental harmonic or the first order harmonic. The n=2, 3, 4, . . . terms have successively shorter spatial periods, higher spatial frequencies, and are the second order, third order, and fourth order harmonics, respectively, and so forth.

FIG. 6B illustrates f(t) 108 with the first four order harmonics 110, 112, 114, 116 for f(t) 108. Those of ordinary skill in the art of tire tread design will understand that evaluation of the lower order harmonics, i.e., the first, second, third, and/or fourth orders, will reflect tire uniformity and evaluation of the higher order harmonics, which typically range from about 50 to about 80 and will reflect audible noise.

With the details of tread design described generally, and now with reference to FIGS. 1-3 and 7-11, an exemplary method 120 for improving the high speed uniformity of a particular tread design by a rib shift methodology is described with greater detail.

The method 120 begins in Block 122 where a first tire tread design is determined. A tire 10 may be manufactured and/or modeled according to the first tire tread design. While the tire tread design may, for example, be similar to the design shown in FIGS. 1-2 or in accordance with FIGS. 8 and 9, described in detail below, these particular structures and design are not necessary or required and the method 120 should not be limited to any particular tread design illustrated or described herein.

Figure 8:
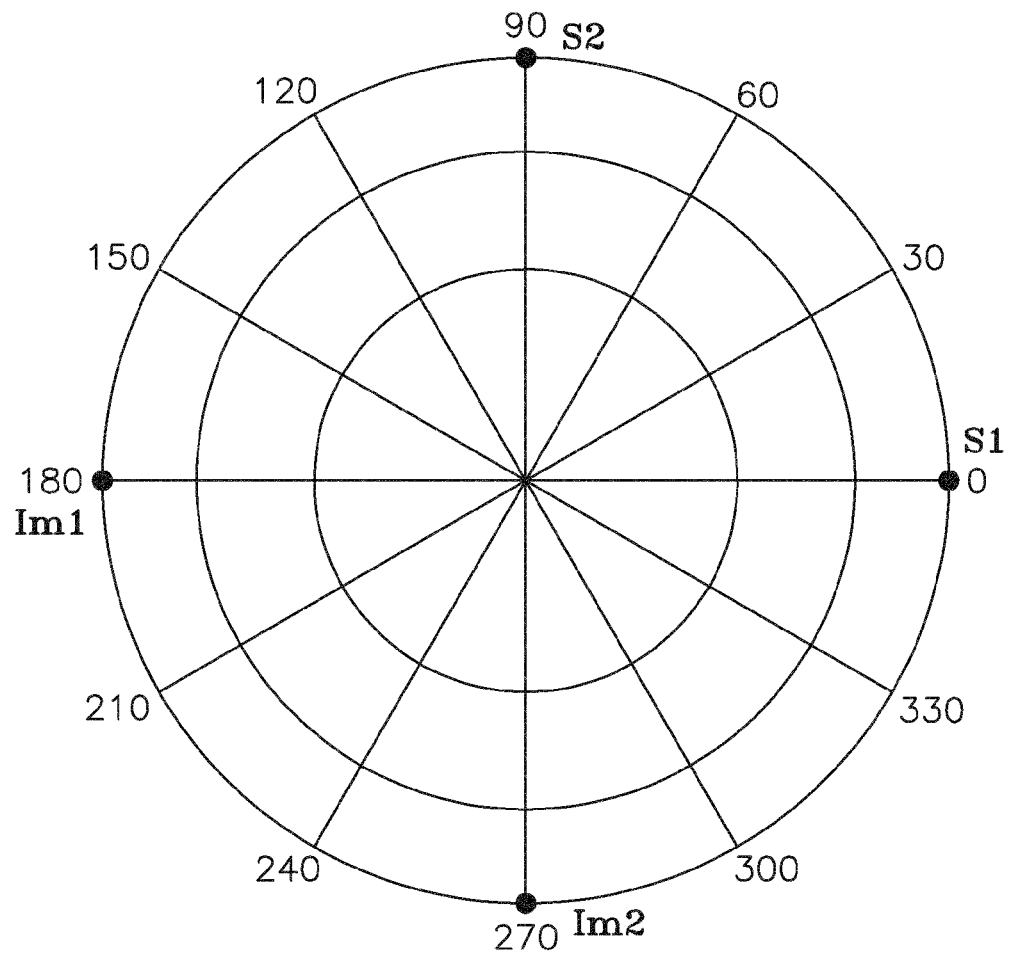
FIG. 8 is a radial plot demonstrating the shifts of each of four ribs comprising the tread design.
Figure 9:
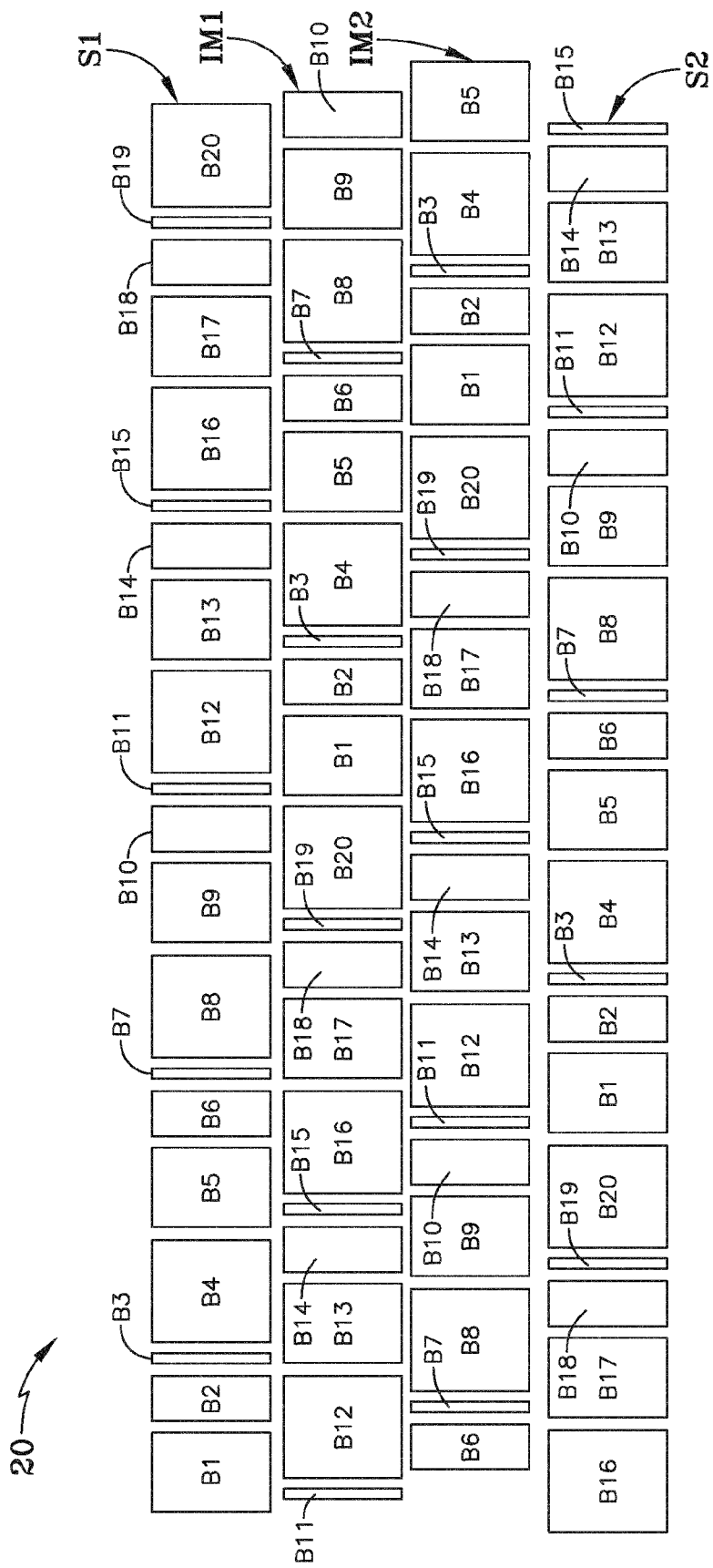
FIG. 9 is a diagrammatic tread-360 design where each of the four ribs includes 20 block elements and each rib is shifted in accordance with the radial plot of FIG. 8.

For purposes of illustration, FIGS. 8 and 9 illustrate one tread design having the first and second shoulder ribs S1, S2 and the first and second intermediate ribs Im1, Im2 The tread design is shown in FIG. 9 as a tread-360, which is a linear, negative impression that would be generated by contacting the tread 20 with a planar surface, such as the road. For purposes of illustration only, each rib S1, Im1, Im2, S2 is comprised of 20 blocks (labeled as B1-B20), or five units of four blocks (series of four) each, and is said to have a pitch equal to four. The use of the 20-block rib pattern herein is for convenience only, to aid simplicity of the described method, and should not be considered limiting.

The first shoulder rib S1 includes the blocks B1-B20 in consecutive order to define a relative baseline as illustrated in the radial plot of FIG. 8 as having a 0° rib or phase shift. The second shoulder rib S2 and the intermediate ribs Im1, Im2 are physically shifted relative to the first shoulder rib S1. Said another way, each of the four ribs S1, Im1, Im2, S2 is rotated about the circumference of the tire 10 (FIG. 1) to shift the blocks B1-B20 in relation to the blocks B1-B20 of the other ribs. For example, and as shown in the figures, the second shoulder rib S2 is shifted 90° with respect to the first shoulder rib S1. This is diagrammatically illustrated in FIG. 9 by shifting the blocks $(B1-B20)_{S2}$ of the second shoulder rib S2 such that the first block $B1_{S2}$ aligns with the sixth block $B6_{S1}$ of the first shoulder rib S1. This calculation, which is apparent to those skilled in the art includes:

$$\frac{\theta}{360°} = \frac{x}{20} \qquad \text{Equation 5}$$

where θ is the degree of rib shift and x is the number of blocks by which the rib is shifted relative to another rib (e.g., if θ=90°, then x=5).

In like manner, the first intermediate rib 1 ml is shifted 90° with respect to the second shoulder rib S2 and 180° with respect to the first shoulder rib S1 in FIG. 8. As a result, the first block $B1_{Im1}$ of the first intermediate rib 1 ml aligns with the eleventh block $B11_{S1}$ of the first shoulder rib S1, for a shift of 10 blocks. The second intermediate rib Im2 is shifted 90° with respect to both the first should rib S1 and the first intermediate rib 1 ml and 180° with respect to the second shoulder rib S2. Therefore, the first block $B1_{Im2}$ of the second intermediate rib Im2 aligns with the sixteenth block $B16_{S1}$ of the first shoulder rib S1, for a shift of 15 blocks.

A tire may then be manufactured in accordance with this tire tread design and using one of several methods and materials that are conventionally known and used by those of ordinary skill in the art of tire manufacture. One exemplary method of manufacturing the tire 10 is described in U.S. Pat. No. 7,195,047 by Sieverding et al., entitled TIRE MANUFACTURE MODULE AND METHOD OF MANUFACTURING TIRES, the disclosure of which is incorporated herein by reference in its entirety. Alternatively, the tire 10 may be mathematically modeled using the computer 84 (FIG. 5). For example, a detailed mathematical model of the tread design may be input, a force variation simulated, and the tread design altered incrementally for recalculation of the force variation with the new tread design. However, this finite element analysis method requires a large amount of computational time and resources. Therefore, other methods of simulating the tire may be used such as the void function analysis of U.S. Pat. No. 7,533,010 by Sundkvist, et al., entitled METHOD AND SYSTEM FOR TREAD PATTERN NOISE OPTIMIZATION or the average pitch analysis of U.S. Pat. No. 6,800,161 by Takigawa, et al., entitled METHOD OF ARRANGING CYCLIC PATTERNS IN TIRE TREAD. Both disclosures are incorporated herein by reference in their entireties. Briefly, and in accordance with the latter disclosure, the cyclic pattern of the tread design for each rib S1, Im1, Im2, S2 (FIG. 2) having the particular pitch sequence is input. The tread design pattern of each rib may be mathematically represented so that its Fourier expansion may be defined and the effect of shifting ribs on the tread harmonic orders may be evaluated. Besides decreased computational time, these simplified tire models have additional benefits as compared to the finite element analysis methods. For example, finite element analysis requires a whole tire analysis where the simulated forces are the accumulated effects due to all ribs simultaneously. In the simplified model analysis, the user may specifically analyze the force and/or harmonic effects of each rib individually.

With the tire manufacture (or modeling) step of Block 122 complete, the HSU force variation of the tire is measured in Block 124. While HSU forces may be measured in any one of the three directions 56, 58, 60, analysis of the second harmonic of the tangential force variation is described herein due to its inherent nature as a particularly problematic harmonic. While not wishing to be bound by theory, it is believed that the second harmonic is particularly problematic because it matches the natural resonance, i.e., the fore-aft resonance, of the tire construction within normal operating speed ranges and of greater influence on non-uniformity as compared with other, off-resonance harmonics.

According to one embodiment, to measure the HSU tangential force 60, the tire 10 may be mounted onto the HSU machine 54 (FIG. 4) and positioned to be in contact with the roadwheel 62 (FIG. 4). The HSU machine 54 (FIG. 4) is then operated to rotate the tire 10 at a desired angular velocity, for example, an angular velocity corresponding to a land speed of 120 mph (about 193 km/hr). The force cells measure or determine the variations in the tangential forces 60 of the rotating tire and convert the measured variations into an analog or digital signal. The signal is relayed to the controller 74 (FIG. 4), where a waveform is generated, displayed, and/or output. The operator may use the controller 74 (FIG. 4) or other suitable computer 84 (FIG. 5) to analyze a second order harmonic 128 of the waveform f(t) in Block 126. For example, the Model 1064B High Speed Uniformity Machine may be purchased with software packages (SpectraPAC HSU) that are suitable for force variation analyses.

In the computer simulation embodiment, the analysis steps of Blocks 124 and 126 may include the Fourier expansion that was described above or other methods that would be readily understood by those of ordinary skill in the art.

Figure 10A:
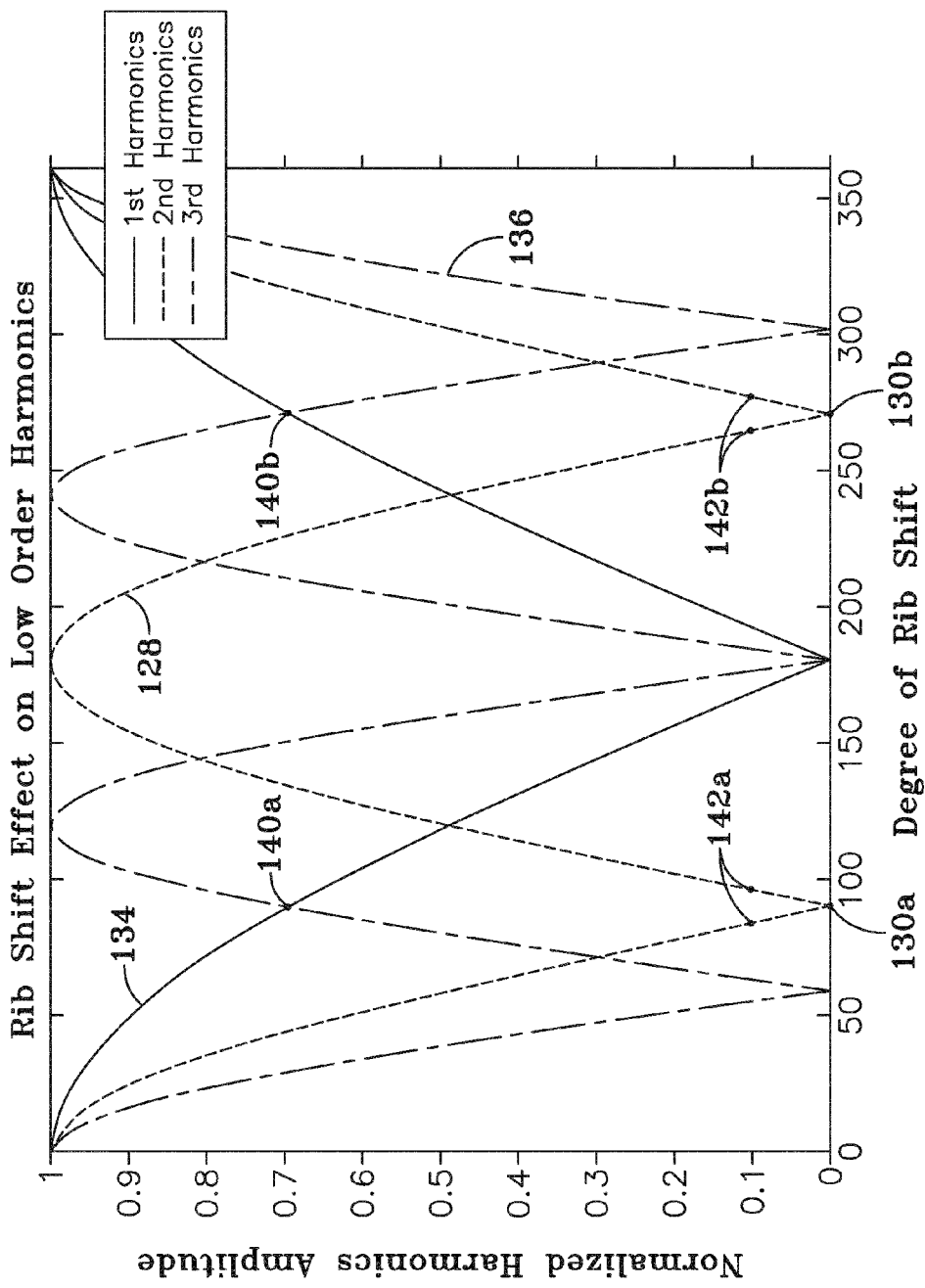
FIGS. 10A-10B are graphs illustrating the relation between the degree of rib shift and resultant harmonic amplitudes of a tire having the ribs shifted as shown in FIGS. 8 and 9.

FIG. 10A illustrates an example of the second order harmonic 128 of the modeled tire 10 having the tire tread design of FIGS. 8 and 9. The simulation data assumed perfect tire symmetry and uniform rib stiffness distributions (i.e., all blocks and ribs having the same length, width, and height). It can be seen from FIG. 10A that the second order harmonic 128 has two localized minima 130a, 130b corresponding with 90° and 270°, respectively.

Returning now to FIG. 7 and with the second order harmonic 128 analyzed, a decision 132 is made as to whether an $n^{th}$ order harmonic analysis is desired for the particular tire tread analysis. Any order of harmonic may be analyzed, including low order harmonics related to uniformity or high order harmonics related to noise analysis.

As shown in FIG. 10A and with continued reference to FIG. 7, the user opted to analyze the first and third order harmonics 134, 136, as in Block 138. While, the second order harmonic 128 is minimized at localized minima 130a, 130b, those points correspond to points 140a, 140b, respectively, of the first and third order harmonics 134, 136, which are approximately 70% of maximum amplitude. Therefore, while rib shifts of 90° and 270° may be advantageous in minimizing the second order harmonic contributions to HSU, these shifts result in nearly maximal first and third order harmonic contributions to HSU. Accordingly, it may be advantageous to the overall tread design and tire performance to slightly sacrifice or compromise the localized minima 130a, 130b of the second order harmonic 128 in order to reduce the other contributors to HSU and to optimize the overall tire performance. For example, rib shifts of 80°-100° and 260°-280° corresponding to points 142a, 142b, respectively, reduce the contributions due to the third order harmonic 136 while only slightly increasing the contributions due to the first and second order harmonics 134, 128.

Figure 10B:
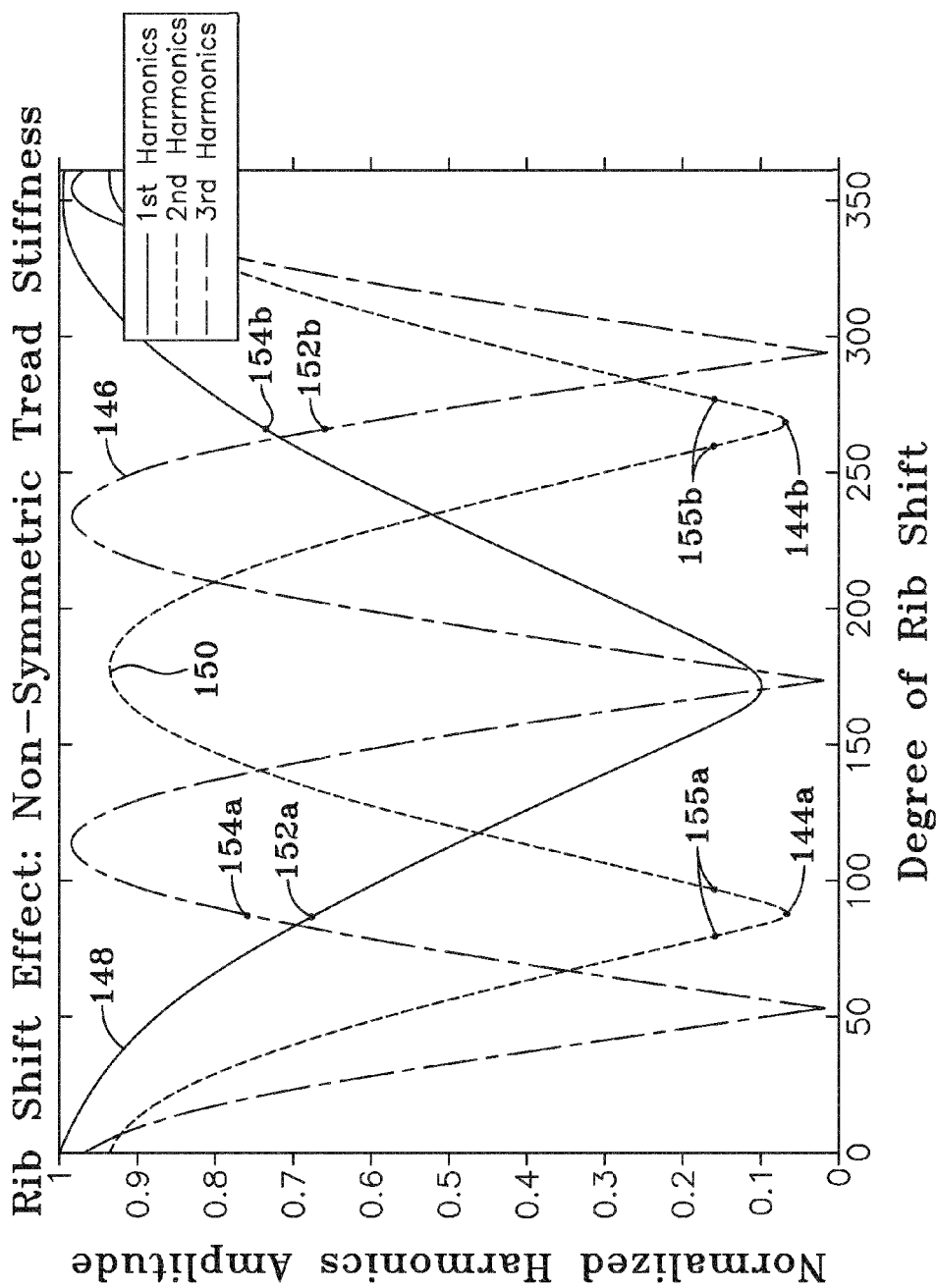

FIG. 10B illustrates an analysis that is similar to the analysis of FIG. 10A; however, the tire tread design has been modeled to include non-symmetric tread stiffness on at least two corresponding ribs. For the particular illustrative example, the simulated tread pattern included stiffness ratios of 1:1.3866:1.6116 and 1:1.2507:1.5607 for a three-pitch sequence, where the stiffness of the blocks of the pattern or sequence is varied by adjusting one or more of the length, height, width, or other known physical parameter. In FIG. 10B, the localized minima 144a, 144b for the second order harmonic 146 are now shifted to about 87.8° and about 267.8°, respectively, with an amplitude of about 8% of maximum; however, the first and third order harmonics 148, 150, are contributing approximately 67% (see points 152a, 152b) and approximately 83% (see points 154a, 154b) of their respective maxima. Optimization of the HSU performance, i.e., minimize the contributions from the first, second, and third order harmonics 146, 148, 150, can be achieved with small physical shifts of the ribs S1, Im1, Im2, S2 by a fraction of a block or other length. One of ordinary skill in the art will readily appreciate the types of shifts necessary for balancing the effects of the various harmonics and to achieve the desired balance of the analyzed harmonics.

Figure 11:
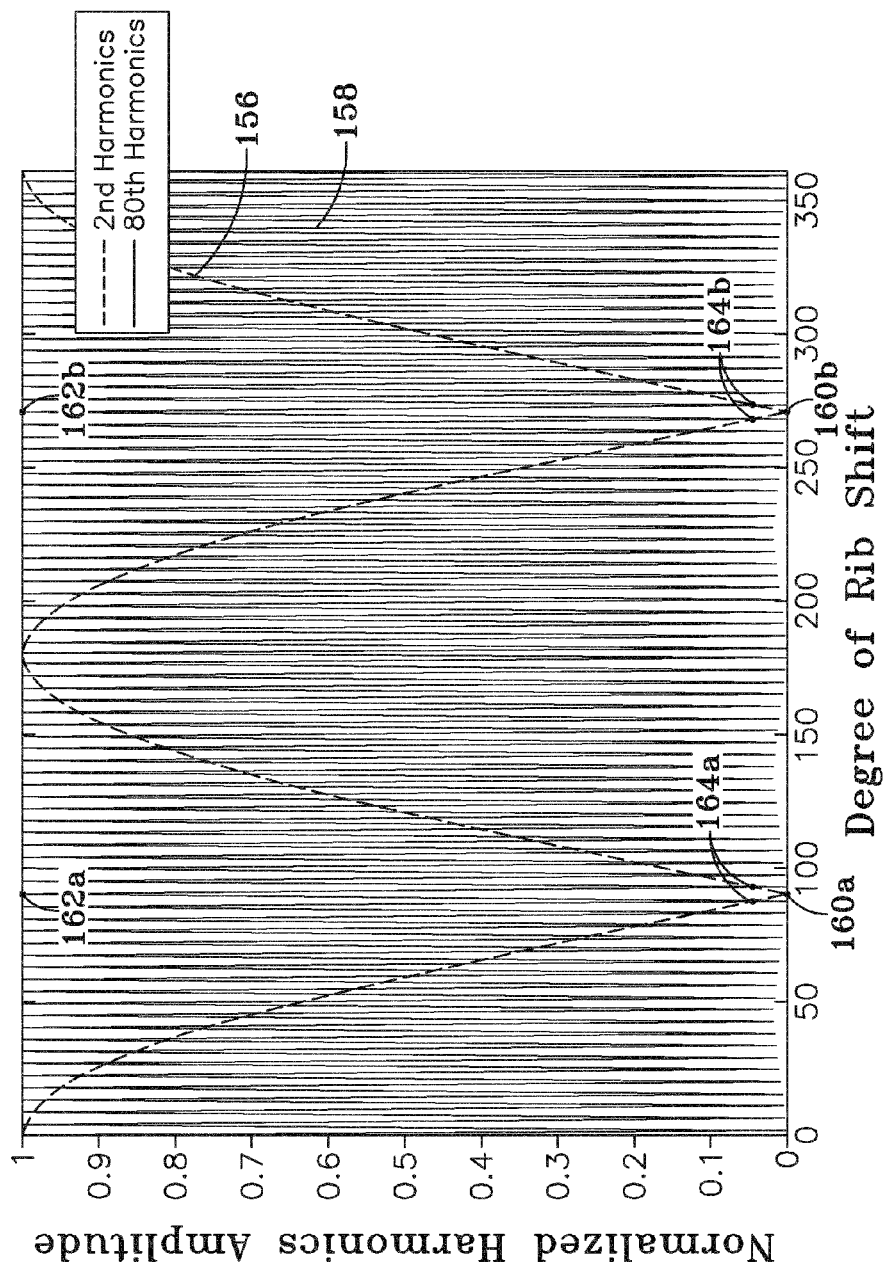
FIG. 11 is a graph illustrating the relation between the degree of rib shift and resultant second and eightieth order harmonics of a tire having the ribs shifted as shown in FIGS. 8 and 9.

FIG. 11 illustrates yet another exemplary analysis where the user analyzed the second order harmonic 156 and the $80^{th}$ order harmonic 158, corresponding to a noise component, in Block 138. One of ordinary skill in the art would readily understand that the slight oscillations in the amplitudes of the $80^{th}$ order harmonic 158 are due to the modeled non-uniform tread stiffness. As shown, the second order harmonic 156 has localized minima 160a, 160b at rib shifts of 87.8° and 267.8°; however, at this same rib shift, the $80^{th}$ order harmonic 144 is positioned about localized maxima 162a, 162b. Therefore, sacrificing slightly on the contributions from the second order harmonic 156 by adjusting the rib shift to about 87°-88.6° and 267°-268.6° at points 164a, 16b, significantly reduces the contributions due to the $80^{th}$ order harmonic 158.

With the appropriate rib shifts determined, a second tire design may be created or generated in Block 166 of FIG. 7. One of ordinary skill in the art would readily understand that the second tire design may then undergo a similar analysis by returning to Block 166 with the second order harmonic alone or to Block 126 to analyze yet another $n^{th}$ order harmonics.

While the present invention has been illustrated by a description of various embodiments, and while these embodiments have been described in some detail, they are not intended to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with methods of practicing the present invention as currently known. However, the invention itself should only be defined by the appended claims.

The invention claimed is:

1. A method of improving high-speed uniformity of tire performance, the method comprising:
    determining a force variation created by rotation of a first tire having a first tread design, the first tread design including two or more ribs having differing degrees of stiffness;
    analyzing a second order harmonic of the force variation with a computer; and
    generating a second tread design that circumferentially shifts one or more ribs of the first tread design to minimize the second order harmonic.

2. The method of claim 1, wherein the force variation is in a tangential direction.

3. The method of claim 1 further comprising:
    creating the first tire according to the first tread design.

4. The method of claim 1 further comprising:
    causing a second tire to be created according to the second tread design.

5. The method of claim 1 further comprising:
generating a third tread design that further shifts the one or more ribs of the second tread design to further minimize the second order harmonic.

6. The method of claim 1 further comprising:
analyzing an $n^{th}$ order harmonic of the force variation such that the generating step further shifts the one or more ribs to also minimize the $n^{th}$ order harmonic.

7. The method of claim 6, wherein the $n^{th}$ order harmonic is the first or third order harmonic for further improving uniformity of the first tire.

8. The method of claim 6, wherein the $n^{th}$ order harmonic is a higher order harmonic for improving a noise affect of the first tire, wherein the higher order harmonic ranges from about 50 to about 80.

9. The method of claim 6, wherein the shift of the one or more ribs optimizes the second and $n^{th}$ order harmonics.

10. The method of claim 1, wherein the rotation of the first tire is simulated on a computer.

11. The method of claim 1, wherein the rotation of the first tire is performed on a high speed uniformity machine.

\* \* \* \* \*

UNITED STATES PATENT AND TRADEMARK OFFICE
CERTIFICATE OF CORRECTION

PATENT NO. : 8,718,990 B2  
APPLICATION NO. : 12/977590  
DATED : May 6, 2014  
INVENTOR(S) : Tao Song et al.

Page 1 of 1

It is certified that error appears in the above-identified patent and that said Letters Patent is hereby corrected as shown below:

In the Specification:

At column 5, line number 29, change "to" to --w--

At column 7, line number 45, after "2" insert --.--

At column 8, line number 12, change "1 ml" to --Im1-- and at line 19, change "1 ml" to --Im1--

Signed and Sealed this  
Ninth Day of September, 2014

Michelle K. Lee  
*Deputy Director of the United States Patent and Trademark Office*